United States Patent [19]
Jacobs et al.

[11] Patent Number: 5,946,853
[45] Date of Patent: Sep. 7, 1999

[54] MODULAR WARDIAN CASE

[75] Inventors: Richard Jacobs; Mitchell Getta, both of Minneapolis, Minn.

[73] Assignee: Orchidarium, Inc., Minneapolis, Minn.

[21] Appl. No.: 08/610,159

[22] Filed: Feb. 29, 1996

[51] Int. Cl.$^6$ .............................................. A01G 31/00
[52] U.S. Cl. .................................................... 47/60
[58] Field of Search ........................... 47/60 R, 60 EC, 47/69, 65.5

[56] References Cited

U.S. PATENT DOCUMENTS

| | | | |
|---|---|---|---|
| 2,051,461 | 8/1936 | Lee | 47/60 |
| 2,141,478 | 12/1938 | Lund | 47/60 |
| 3,458,951 | 8/1969 | Martin | 47/60 |
| 4,198,783 | 4/1980 | Leroux | 47/60 |
| 4,291,494 | 9/1981 | Knablein et al. | 47/69 |
| 4,543,744 | 10/1985 | Royster | 47/60 |
| 5,315,834 | 5/1994 | Garunts et al. | 47/60 |

*Primary Examiner*—Michael J. Carone
*Assistant Examiner*—Joanne C. Downs
*Attorney, Agent, or Firm*—D. L. Tschida

[57] ABSTRACT

A multi-section enclosure adapted to support an artificial environment for growing plants. Vertical edges of opaque and transparent wall sections interlock with one another and horizontal edges mount to formed channels at a domed cover and support base. A sliding door cooperates with slide spacers fitted about an opening at the transparent wall. A plurality of hangers are suspended from a transparent divider panel which separates an internal illumination source and reflector from a growing space. Slide shutters mounted to vent apertures at the divider and cover cooperate with a fan at one of the divider apertures to control internal air circulation and temperature within the growing space. The spaced door and cover vent control make-up and exhaust air flow.

17 Claims, 8 Drawing Sheets

MODULAR WARDIAN CASE

BACKGROUND OF THE INVENTION

The present invention relates to plant growing chambers and, in particular, to a modular assembly for maintaining an artificial growing environment to sustain the growth of a variety of plants, particularly tropical plants such as orchids.

A variety of plant growing chambers, hot houses and simple display cases are known. The complexity and sophistication varies from simple structures to prevent physical damage to the plants during transport or display to structures which provide artificial growing environments. The latter assemblies are typically constructed with unitary side walls, but which creates difficulties during construction and shipping. That is, it is difficult to provide chambers which hold a number of plants, but which disassemble to a compact size for transport.

The present "wardian case" was developed to provide a modular growing assembly, which disassembles to a relatively small package, and which is readily reassembled without resort to active fasteners. The case permits the establishment of a regulated humidity, temperature and air flow within the chamber. Shelves and sundry plant maintenance appliances are supported to a support system which is hung from a circulation, divider panel without interference at the side walls. The assembly is also adaptable to economical construction in a variety of sizes.

SUMMARY OF THE INVENTION

It is a primary object of the invention to provide a sectional, artificial growing chamber which disassembles to a relatively few panels and the side panels of which passively interlock with one another and an adjoining cover and base.

It is a further object of the invention to provide a chamber particularly adapted for growing tropical plants under artificial lights with controlled air flow, temperature and humidity.

It is a further object of the invention to control air circulation through an illumination space and a growing space that are separated by a divider panel which supports a circulation fan aligned to at least one shuttered vent aperture at the divider panel.

It is a further object of the invention to control exhaust air flow with a shuttered vent in the cover.

It is a further object of the invention to provide low voltage fluorescent source lighting and which illumination is directed via a reflector panel to provide a uniform column of light of substantially constant cross sectional intensity to all areas within the case.

It is a further object of the invention to provide an opaque side wall having channeled edges which align to a mating transparent wall and which walls cooperatively interlock with recessed channels and flanges formed at the cover and base.

It is further of the invention to provide a divider panel having notched peripheral edges and hanger clips which support a screen shelf support.

Various of the foregoing objects, advantages and distinctions of the invention are obtained in a multi-section, molded plastic assembly. Peripheral channels at a domed cover and base tray interlock with a pair of opaque and transparent side walls. Vertical channels at the opaque side wall receive the vertical edges of the transparent side wall to interlock one to the other. The peripheral channels at the base and cover passively lock the side walls to the base and cover.

A number of low voltage, fluorescent lights are supported beneath a reflector panel mounted to the domed cover and above an air circulation divider panel that is supported from the side walls. A pair of slide shutters cooperate with vent apertures at the divider panel to control aperture exposure. A fan aligned to one of the divider panel apertures controls circulation of heated air between the illumination space and the growing space.

A door is slide mounted to the cover and base and cooperates with spacers fitted to the transparent side wall. The spacers facilitate door operation. An air space is also obtained with the spacers and ports beneath the door which provide make-up air to the case. A separate shutter and vent opening at the cover control exhaust air flow.

Notches at the peripheral edge of the divider panel support a number of clips and a suspended screen which, in turn, supports a number of tiered perforated shelves and other plant care appliances. An electronic humidity gauge and thermometer measure internal growing conditions. Shelf hangers may also be suspended from the divider panel.

Still other objects, advantages, and distinctions of the invention will become more apparent upon reference to the following description with respect to the appended drawings. To the extent various modifications and improvements have been considered, they are described as appropriate. The description should not be construed in limitation of the scope of the invention, which rather should be interpreted within the scope of the further appended claims.

DESCRIPTION OF THE PREFERRED EMBODIMENT

Figure 1:
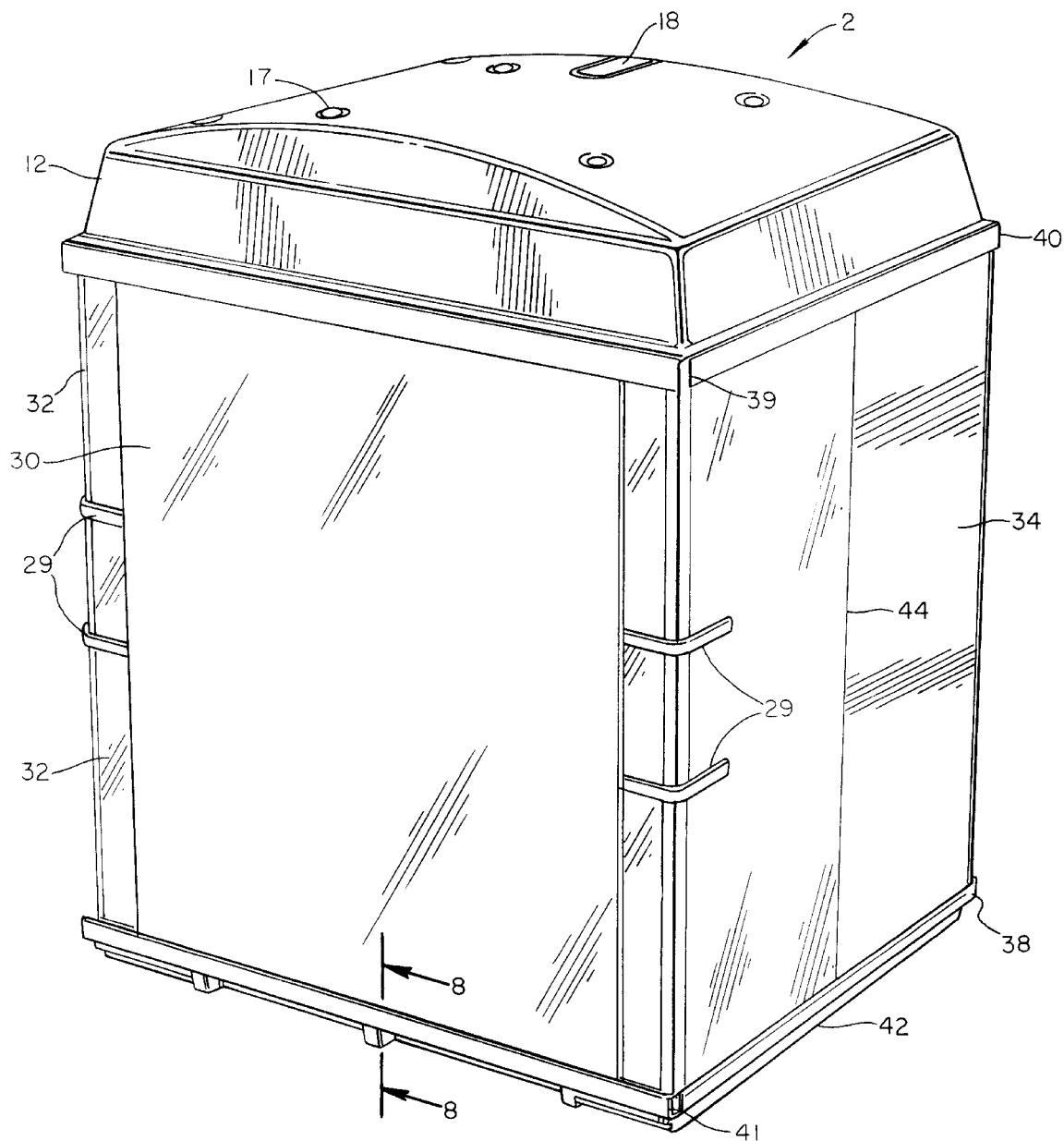
FIG. 1 is a perspective drawing to the wardian case of the invention.
Figure 2:
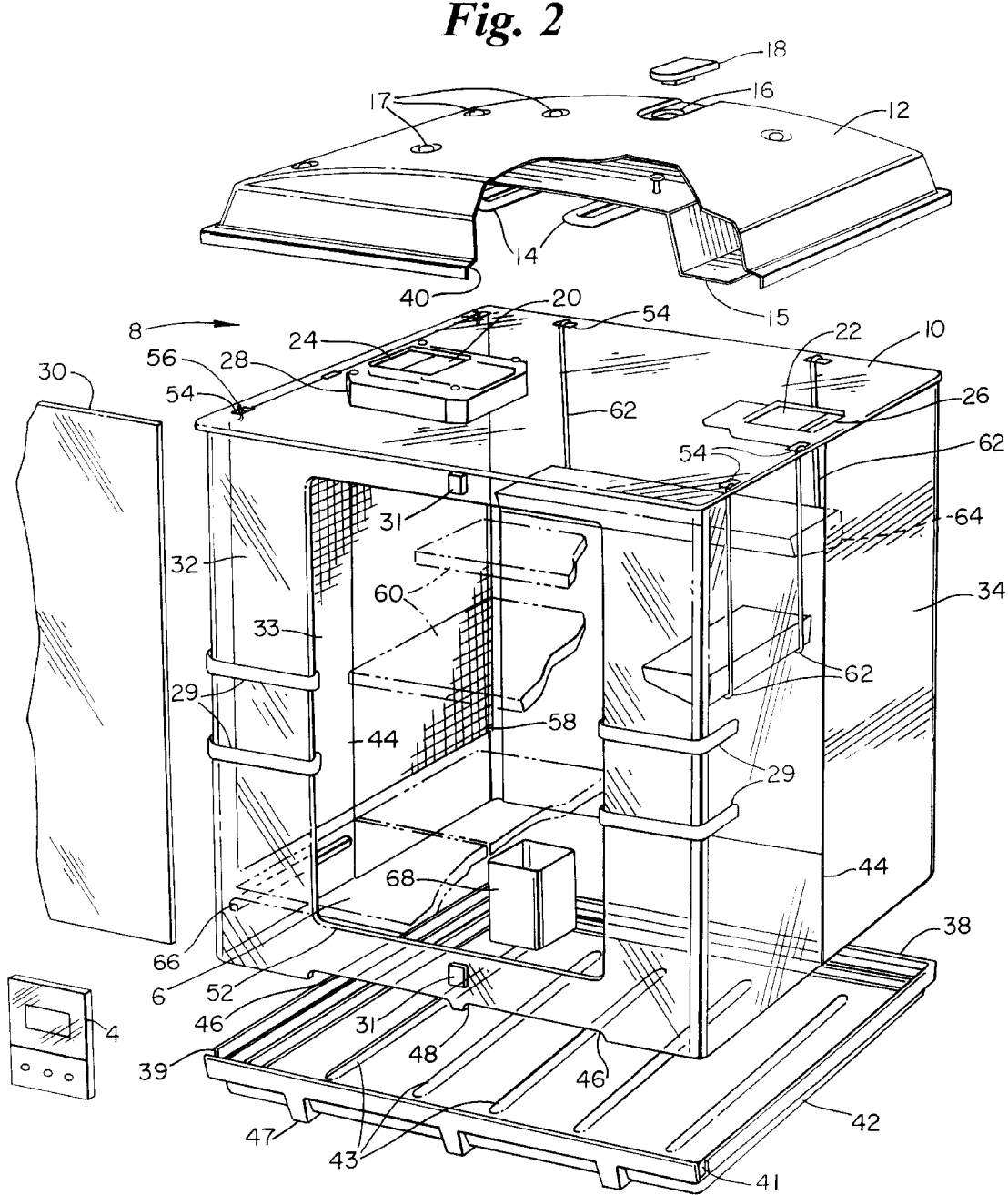
FIG. 2 is a perspective drawing shown in exploded assembly and partial cut away to the case.
Figure 3:
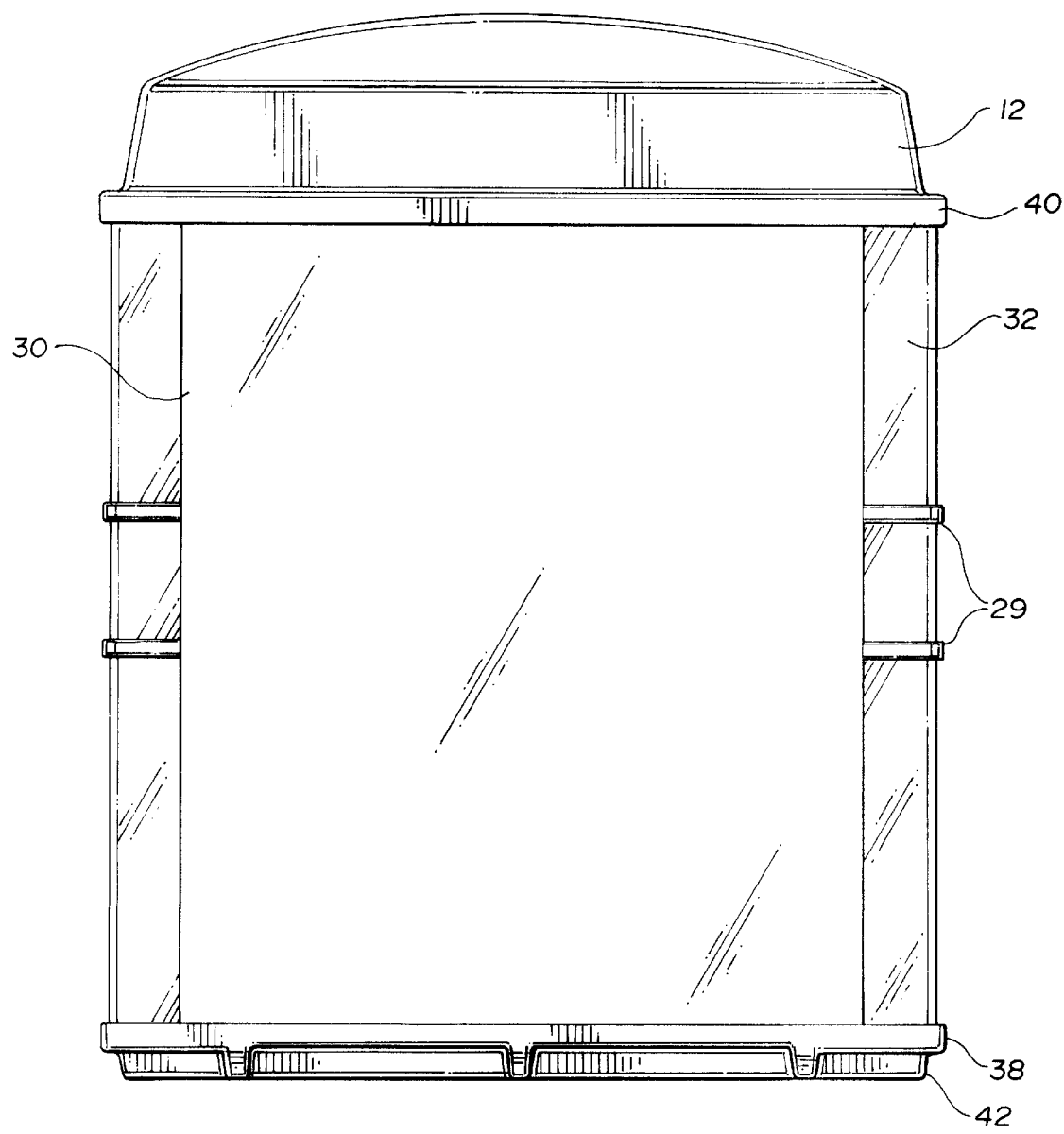
FIG. 3 is a front plan view of the case with the door closed.
Figure 4:
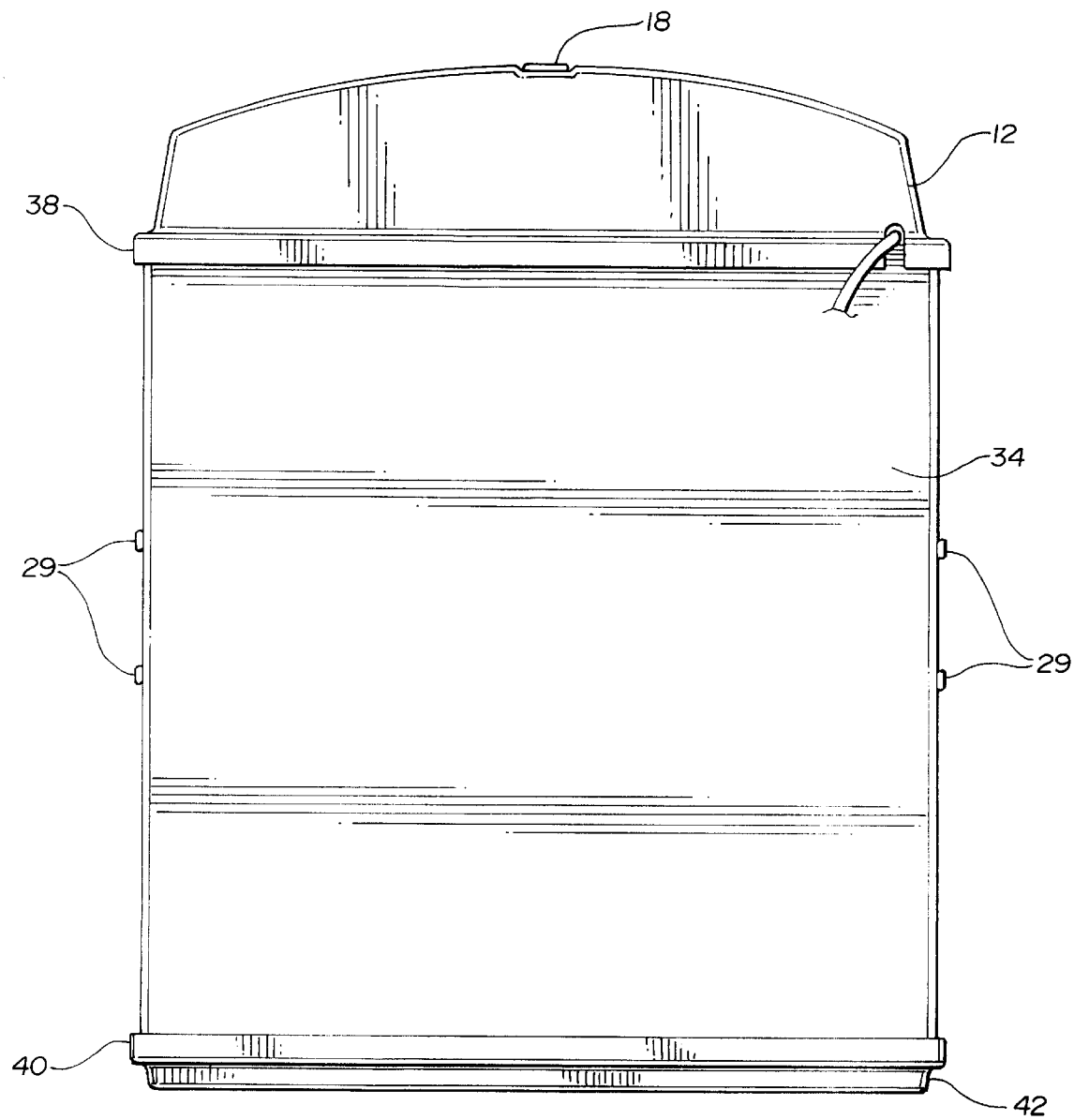
FIG. 4 is a rear plan view of the case.
Figure 5:
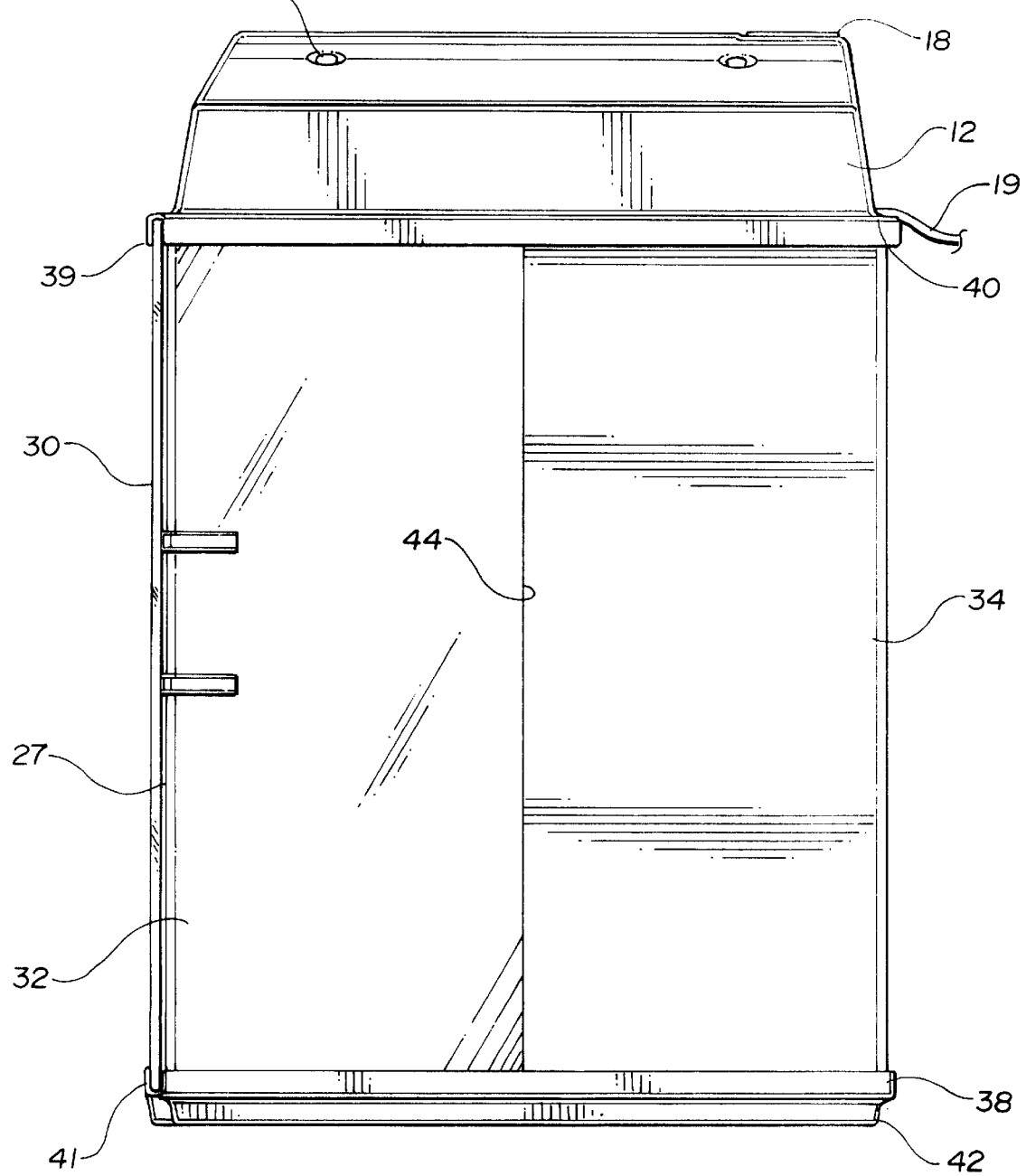
FIG. 5 is a right side elevation view of the case, the left side view being a mirror image.
Figure 6:
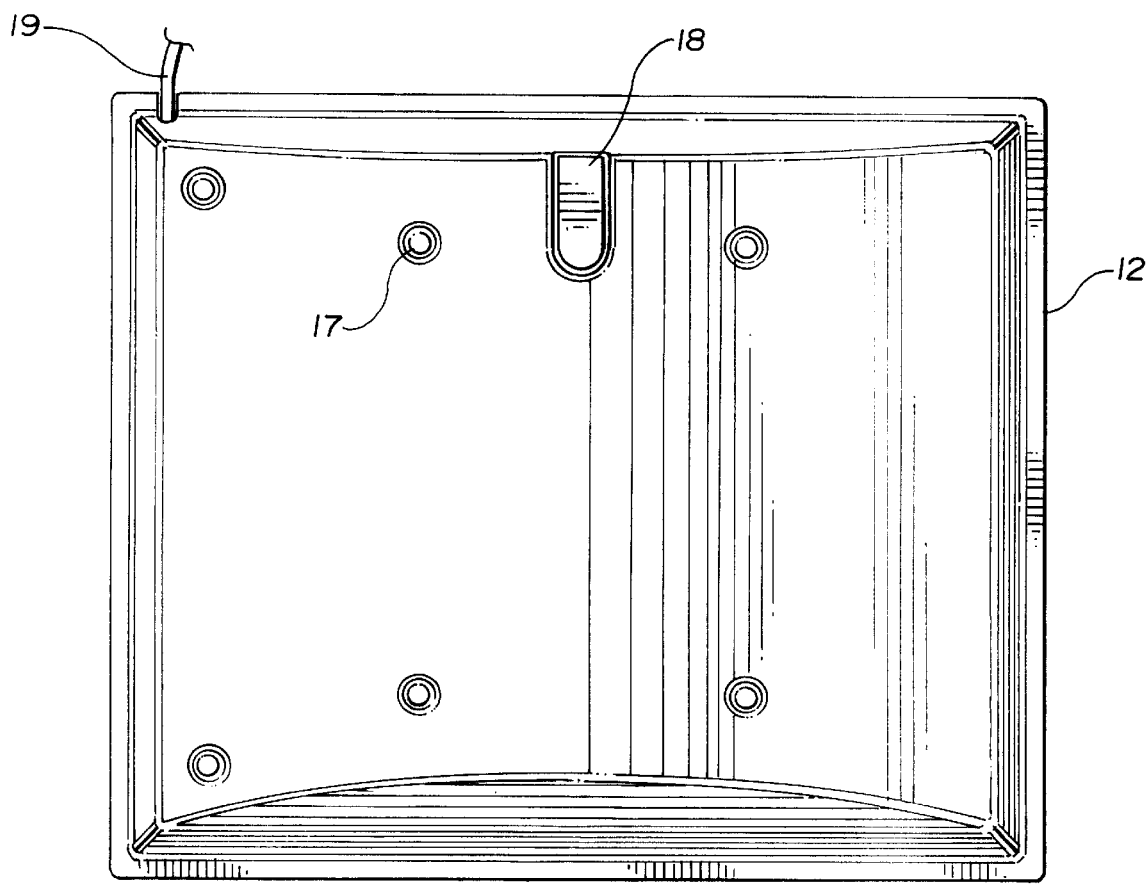
FIG. 6 is a top plan view of the case.
Figure 7:
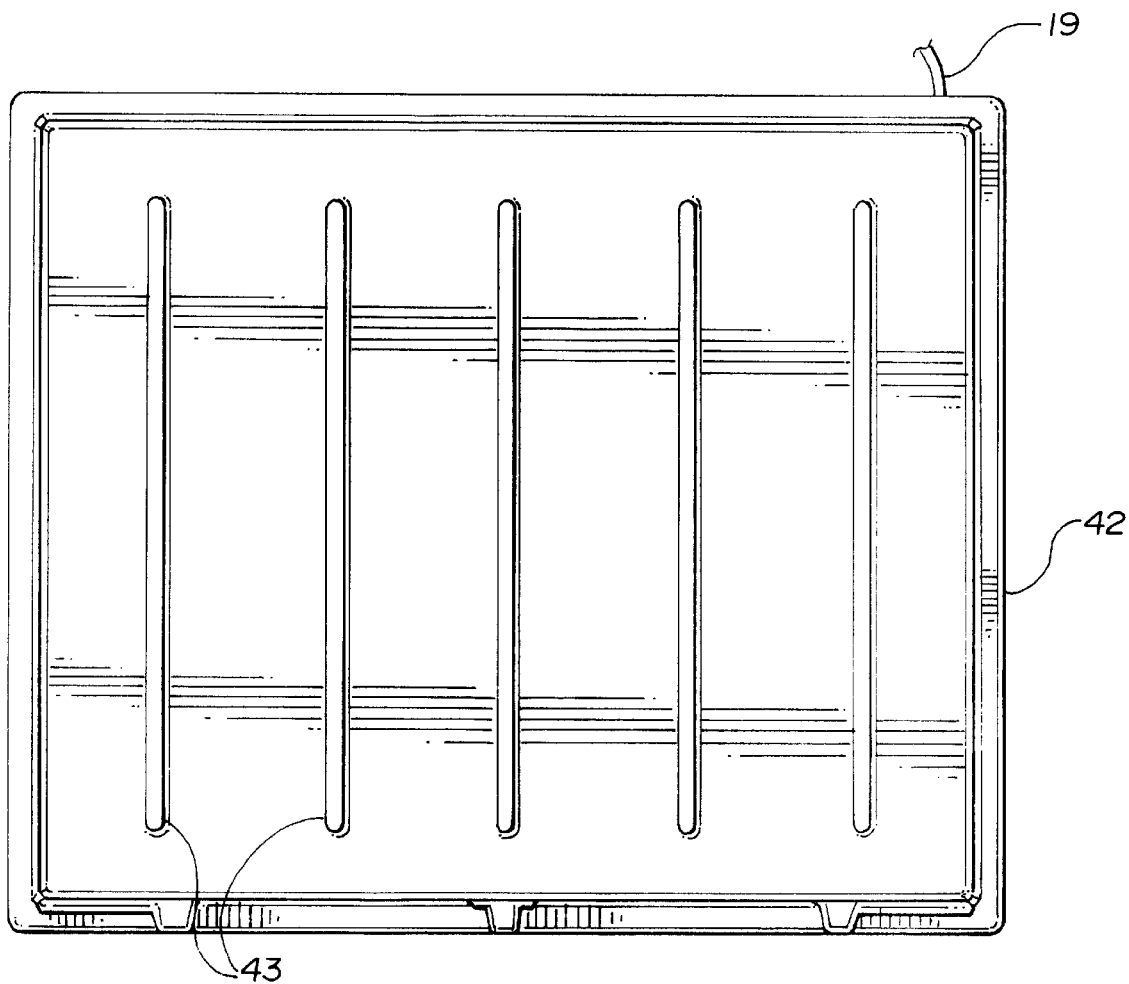
FIG. 7 is a bottom plan view of the case.

With attention to FIGS. 1 and 2, perspective drawings are shown to the modularly constructed wardian case 2 of the invention. The case 2 provides a controlled environment for growing plants, such as orchids and other tropical plants, which require closely controlled temperature and humidity conditions to sustain plant life and facilitate plant bloom. FIGS. 3 through 7 depict further views to the external configuration of the case 2.

Growing conditions are monitored with an electronic thermometer and/or hygrometer 4 which is suspended within a growing space 6. Appropriate humidity is obtained with periodic waterings from a hand held mist sprayer (not shown) and liquid contained at a base reservoir. Internal temperatures are maintained with the circulation of heated air drawn from a cover space 8 between a divider panel 10 and a domed cover 12.

A number of low voltage fluorescent lamps 14 are mounted within the cover space 8 and provide artificial lighting which is diffused by a generally concave, SILVER-LUX SILVER coated reflector 15. The lamps 14 and reflector 15 are suspended from fasteners 17 that are secured to the cover 12. Power is supplied from a cord 19.

Depending on the size of the growing space 6, an appropriate number and grouping of lamps 14 are fitted to the case 2. A number of computer generated flat surfaces at the reflector 15 cooperate to direct a uniform column of illumination through the growing space 6. The reflector 15 particularly provides a column having constant cross sectional illumination at each level throughout the entire growing space 6. Depending upon the various plants supported in the case 2, each plant can be supported to a shelf with an appropriate vertical spacing from the lamps 14 to provide a preferred foot candle condition.

As appropriate, heated air within the cover space 8 is circulated through the growing space 6 to maintain a uniform temperature and humidity within the growing space 6. An exhaust vent 16 and slide shutter 18 are provided at the cover 12. Make-up air is admitted from an air space provided at an access door.

Proper temperature and air circulation is particularly obtained with a pair of slide shutters 20, 22 at circulation vents 24, 26 at the divider panel 10. A fan 28 is suspended from the divider panel 10 in alignment with the vent 24 to circulate the air from the cover space 8, through the growing space 6 and back to the cover space 8 via the vent 26. Depending on the exposure established at the vents 24, 26, a desired volume of heated air is circulated through the growing space 6. Although the fan 28 presently operates continuously, a temperature sensitive controller, such as a simple thermostat, might be coupled to the fan 28.

The air temperature is controlled via the exposure of the exhaust vent 16 and the make-up air that is provided to the case 2. Make-up air is presently obtained from an air space 27 defined by a number of slide tracks 29 fitted between a door 30 and a transparent side wall 32, see also FIG. 8. The tracks 29 are constructed of leather strips which are adhesively bonded to the case 2. A resilient plastic material might also be formed to snap mount to the wall 32 and door opening 33. Other vent openings with controlled covers might also be fitted to the side walls and/or door 30.

The volume of the growing space 6 is determined upon the fitting of the transparent side wall 32 to an opaque side wall 34 and the retention of the interlocked side walls 32, 34 to flanges 38 and 40 at the peripheral edges of the cover 12 and a base tray 42. Open corners 39 and 41 are provided at the front of the cover and base 12 and 42 to accommodate a slide action of the door 30 relative to the wall 32, see also FIG. 5.

Once fitted together, the cover and base 12 and 42 passively restrain the side walls 32, 34 to the depicted rectangular shape. The shape is maintained even upon removal of the cover 12 via the separate mounting of the divider panel 10 to the top edges of the walls 32 and 34. Depending flanges (not shown) at the divider panel 10 contact the side walls 32, 34 to retain the proper shape and alignment to receive the cover 12.

The cover 12 and base 42 are molded from an opaque plastic using conventional molding techniques. Drain channels 43 are formed in the base 42 to collect condensation which drip from the plants or liquids periodically added to the base. The base 42 thus acts as a moisture reservoir.

The side wall section 32 is constructed of a transparent acrylic plastic that is bent at the corners to extend around the sides of the case 2. The wall 34 is constructed of a corrugated, polypropylene board material. The material is light weight, and is readily bent at the corners of the cover and base 12, 42 to fit the flanges 38, 40. A "U" shaped vertical channel 44, when viewed from above, at each vertical edge of the wall 34 receives and supports an edge of the formed side wall 32 to interlock one to the other. The coupling is maintained with the fitting of the walls 32, 34 to the flanges 38, 40, which are sized and shaped to prevent the walls 32, 34 from springing apart. Retention is presently enabled via the weight of the divider panel 10 and cover 12. An adhesive might be used at the channels 44. Clip fasteners or seals (not shown) might also be added at the joints 44 to facilitate retention. The use of unbound joints between the walls 32, 34 and cover 12 and base 42, otherwise, advantageously permits disassembly of the case 2 for storage and transport.

The wall 34 is presently provided in a white color to reflect light. A variety of other colors and reflective coatings may alternatively be applied to selected surfaces to control illumination and provide a suitable back drop for viewing the contained plants. In lieu also of the present pair of wall sections 32 and 34, a number of flat panel, interlocking wall sections might be used. Additional panels might also be fitted between the walls 32, 34 and/or replace the sections 32, 34 to vary the physical size of the case.

Figure 8:
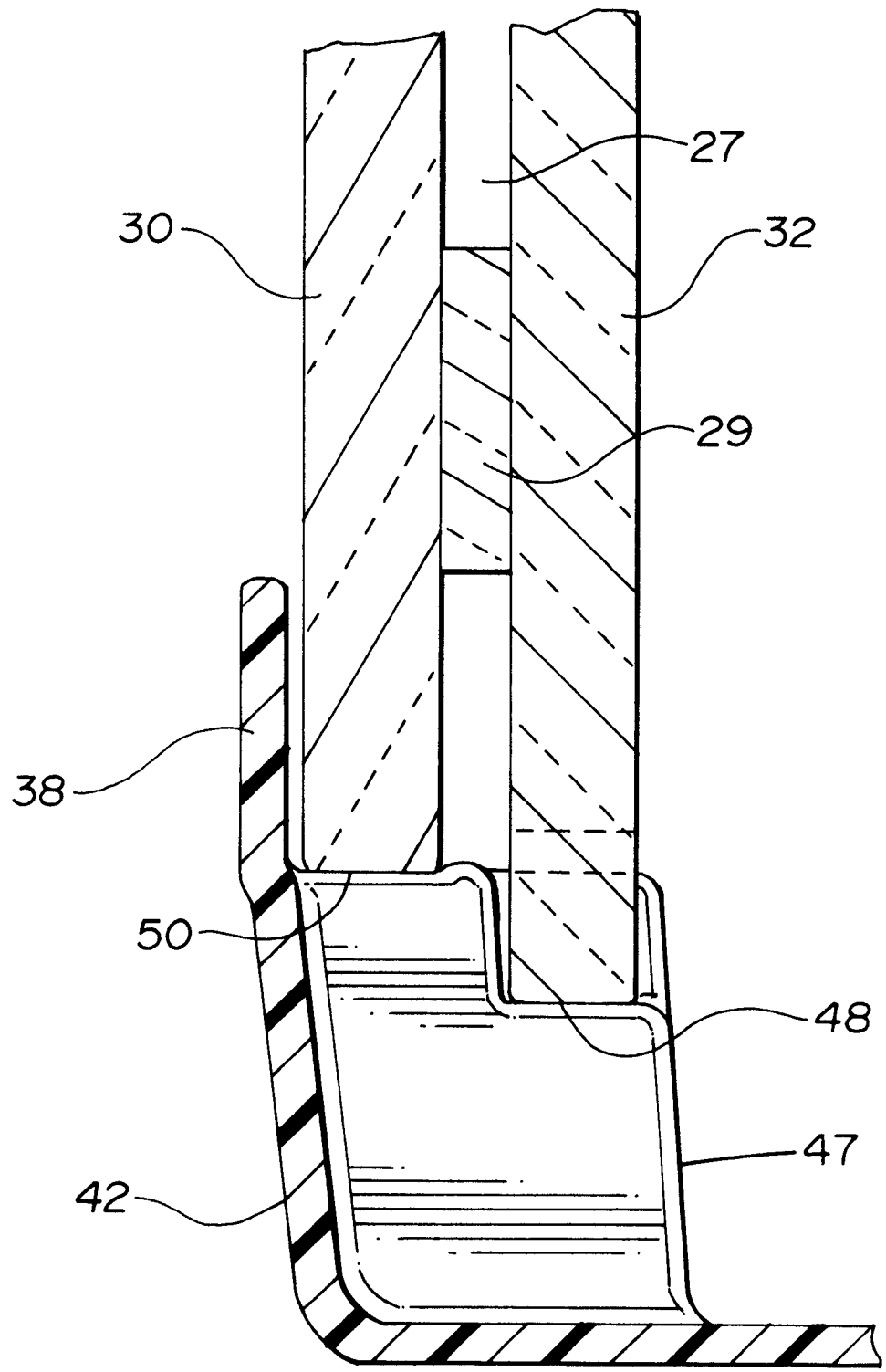
FIG. 8 is a cross section view taken along section lines 8—8 of FIG. 1 through the base.

With attention to FIGS. 2 and 8, the flanges 38, 40 are more apparent and which provide a sufficient height to contain the walls 32, 34 to the cover and base 12, 42. Notches 46 and a tang 48 are also formed at the lower edge of the wall 32 to index the wall 32 to the base 42. A raised ledge 50 at the base 42, beneath the door opening 52, provides a slide surface for the door 30. Channels 47 adjacent the door 32 also provide make-up air to the growing space 6.

A particular advantage of the foregoing modular construction is that fasteners are avoided at the walls which increase assembly difficulty and can be susceptible to corrosion over protracted periods of use. Growing cases 2 of relatively larger sizes versus conventional cases are also obtainable at reasonable cost, due to the less costly fabrication technology. The modularity also enhances the ability to transport the case 2.

Supported to the cover 12 adjacent the side walls 32 and 34 is the divider 10. The divider 10, like the wall 32, is constructed of a transparent acrylic plastic which passes the illumination of the light source 14. A number of notches or cutouts 54 are provided at the peripheral edges of the divider 10. A number of clips 56 are suspended at the notches 50 and support a screen panel or shelf support 58. Secured to the support 58 are a number of perforated shelves 60. The shelves 60 are retained with a number of other clips of suitable shape (not shown). In a preferred construction, a single screen support 58 is bent to mount adjacent both sides and the back of the case 2. A wide variety of shelf mountings and/or other plant care appliances are thus obtainable.

Also shown at FIG. 2 are hangers 62 that can be mounted to the apertures 54 to directly support a shelf or tray 64. The hangers 62 can be constructed to a variety of forms compatible with the notches 54 and mating shelves 64. The hangers 62 can be constructed of a variety of materials, including clear or opaque plastics or other corrosion resistant metals. Necessary offset bends are provided at the hangers 62 to mate with the divider 10 and shelves 64. Also shown is a conventional shelf support rail 66 and a riser 68, only one each of which are shown, which might be bonded to the side walls and the base 42 to support the edges and mid-section of a shelf straddled between the rails 66.

The clips 56 and one or more screen supports 58 or hangers 62 are preferred to shelf support rails 66. The screen support 58 and hangers 62 facilitate the mounting of a greater variety of shelves 60 and 64 and spacings within the growing space 6.

While the invention has been described with respect to a presently preferred construction and considered modifications and improvements, still other variations might be suggested to those skilled in the art. The invention should therefore be interpreted to include all those equivalent embodiments within the spirit and scope of the following claims.

What is claimed is:

1. A plant growing case comprising:
   a) an enclosure comprising a base, a cover and first and second side walls, wherein said base and cover support peripheral edges of said first and second side walls, wherein one of said first and second side walls includes a door aperture, wherein a door covers said aperture and wherein said base includes a plurality of channels;
   b) divider means supported between said cover and said base for separating the interior of said enclosure into a growing space between said divider means and said base and a cover air space between said divider means and the cover;
   c) illumination means mounted in the cover air space for illuminating the growing space and wherein heat generated by said illumination means is contained by the divider means to the cover air space;
   d) circulation means for circulating air between said cover air space and through said divider means to said growing space, whereby the air temperature in the growing space is regulated;
   e) a plurality of shelves; and
   f) means for supporting said shelves within said growing space.

2. Apparatus as set forth in claim 1 wherein the circulation means includes:
   a) first and second vent apertures at said divider means that communicate with the cover air space and said growing space;
   b) a fan; and
   c) vent means for controlling the exposure of said first and second vent apertures, and wherein said fan is mounted to direct air flow between said first and second vent apertures.

3. Apparatus as set forth in claim 2 wherein said cover includes an exhaust aperture and means for controlling the exposure of said exhaust aperture.

4. Apparatus as set forth in claim 3 including air spaces to the exterior of said enclosure in a region adjacent said door and door aperture.

5. Apparatus as set forth in claim 3 including means for measuring humidity and temperature within said growing space.

6. Apparatus as set forth in claim 1 wherein one of said first and second side walls is notched to mate with a slide surface at said base, wherein said door is supported to slide on said slide surface, and wherein cutouts are provided at comers of said base to facilitate movement of said door.

7. Apparatus as set forth in claim 1 including a plurality of notches displaced about said divider means, wherein a screen is suspended within said growing space from clips supported to said notches, and wherein a plurality of shelves are supported to said screen.

8. Apparatus as set forth in claim 1 including a plurality of notches displaced about said divider means and wherein a shelf is supported to a plurality of hangers suspended from said notches.

9. Apparatus as set forth in claim 1 wherein said illumination means comprises a fluorescent light and a reflector panel secured to said cover and wherein said reflector panel is mounted between said fluorescent light and said cover.

10. A plant growing case comprising:
    a) an enclosure comprising a base, a cover and a plurality of side walls, wherein peripheral edges of said plurality of side walls are supported at said base and said cover, wherein one of said plurality of side walls includes a door aperture, wherein a door covers said aperture, wherein said base includes a plurality of channels, wherein said door rests on a slide surface at said base, and wherein spaces are defined between said door and door aperture that are exposed to the exterior of the enclosure;
    b) divider means supported between said cover and said base for separating the interior of said enclosure into a growing space between said divider means and said base and a cover air space between said divider means and the cover;
    c) illumination means mounted to said cover for illuminating the growing space and wherein heat generated by said illumination means is trapped in the cover air space; and
    d) means for circulating air between said cover air space and through said divider means to said growing space, whereby the air temperature in the growing space is regulated.

11. Apparatus as set forth in claim 10 wherein said cover includes an exhaust aperture and means for controlling the exposure of said exhaust aperture.

12. Apparatus as set forth in claim 10 wherein one of said plurality of side walls is notched to mate with a portion of said slide surface and wherein cutouts are provided at comers of said base to facilitate movement of said door.

13. Apparatus as set forth in claim 8 wherein some of said plurality of side walls are opaque and others of said plurality of side walls are transparent.

14. Apparatus as set forth in claim 13 wherein some of said plurality of side walls are corrugated and wherein said divider means comprises a transparent panel.

15. Apparatus as set forth in claim 10 wherein one of said plurality of side wall is corrugated.

16. Apparatus as set forth in claim 10 wherein the air circulation means includes:
   a) first and second vent apertures at said divider panel communicating with the cover air space and said growing space;
   b) a fan mounted in said growing space; and
   c) means for controlling the exposure of said first and second vent apertures, and wherein said fan is mounted to direct air flow between said first and second vent apertures.

17. A plant growing case comprising:
   a) an enclosure including a base, a cover and first and second side walls, wherein said base and cover include raised peripheral flanges which support peripheral edges of said first and second side walls, wherein said base includes a plurality of channels, wherein said first side wall is opaque and said second side wall is transparent, wherein said second side wall includes a door aperture, and wherein a door covers said aperture;
   b) a transparent divider panel supported between said cover and said base and separating the interior of said enclosure into a growing space between said divider panel and said base and a cover air space between said divider and the cover;
   c) a reflector mounted to said cover and a fluorescent light mounted beneath said reflector in said cover air space; and
   d) fan means for circulating air between said cover air space and said growing space through first and second vent apertures at said divider panel, whereby the air temperature in the growing space is regulated.

* * * * *